(12) United States Patent
Siev et al.

(10) Patent No.: US 12,150,835 B2
(45) Date of Patent: Nov. 26, 2024

(54) EXTERNAL DRIVE IMPLANTATION APPARATUS FOR BENDABLE COLLAR IMPLANTS AND METHOD

(71) Applicant: NORIS MEDICAL LTD., Nesher (IL)

(72) Inventors: Aharon Siev, Haifa (IL); Rami Siev, Haifa (IL)

(73) Assignee: NORIS MEDICAL LTD., Nesher (IL)

( * ) Notice: Subject to any disclaimer, the term of this patent is extended or adjusted under 35 U.S.C. 154(b) by 191 days.

(21) Appl. No.: 17/991,709

(22) Filed: Nov. 21, 2022

(65) Prior Publication Data

US 2023/0086280 A1 Mar. 23, 2023

Related U.S. Application Data

(60) Division of application No. 17/704,806, filed on Mar. 25, 2022, now Pat. No. 11,612,460, which is a continuation of application No. PCT/IL2020/050981, filed on Sep. 9, 2020.

(30) Foreign Application Priority Data

Sep. 26, 2019 (IL) .......................... 269728

(51) Int. Cl.
*A61C 8/00* (2006.01)
(52) U.S. Cl.
CPC .......... *A61C 8/0093* (2013.01); *A61C 8/0022* (2013.01); *A61C 8/0089* (2013.01)
(58) Field of Classification Search
CPC . A61C 8/00–0098; A61C 1/185; A61C 1/186; A61C 1/188; A61C 1/084; A61C 1/085; B25B 13/48; B25B 13/481; B25B 13/08
See application file for complete search history.

(56) References Cited

U.S. PATENT DOCUMENTS

| | | | | |
|---|---|---|---|---|
| 5,064,375 A | * | 11/1991 | Jorneus | A61C 8/0089 433/116 |
| 5,336,090 A | * | 8/1994 | Wilson, Jr. | A61C 8/008 433/172 |
| 6,280,193 B1 | | 8/2001 | Peltier | |
| 6,416,324 B1 | * | 7/2002 | Day | A61C 8/008 433/173 |
| 2003/0054319 A1 | * | 3/2003 | Gervais | A61C 8/005 433/172 |

(Continued)

FOREIGN PATENT DOCUMENTS

KR 200373710 Y1 1/2005

OTHER PUBLICATIONS

International Search Report (ISR) dated Dec. 9, 2020 issued in International Application No. PCT/IL2020/050981.

(Continued)

*Primary Examiner* — Yogesh P Patel
(74) *Attorney, Agent, or Firm* — Holtz, Holtz & Volek PC

(57) ABSTRACT

An external drive apparatus for bendable collar implants includes a male fastener and a female driver. The male fastener is constructed as a rigid and integral unity including an implant screw, a collar, and a male screw-top drive. The female driver supports a female screw-top drive. The female driver is configured for application of an implantation torque to the implant screw via the male screw-top drive which is disposed distally away from the collar.

5 Claims, 2 Drawing Sheets

(56) References Cited

U.S. PATENT DOCUMENTS

| | | |
|---|---|---|
| 2006/0269903 A1 | 11/2006 | Bulard et al. |
| 2006/0275735 A1 | 12/2006 | Bulard et al. |
| 2011/0014586 A1 | 1/2011 | Jorneus et al. |
| 2014/0298957 A1 | 10/2014 | Ragner |
| 2016/0143712 A1 | 5/2016 | Moser |

OTHER PUBLICATIONS

Israeli Search report issued on Jan. 19, 2020 in corresponding Israeli patent application No. 269728.
Noris Medical Dental Implants Product Catalog 2019, https:/norismedical.com/products/catalog-2.
Written Opinion dated Dec. 9, 2020 issued in International Application No. PCT/IL2020/050981.
1 Notice of Allowance dated Dec. 19, 2022, issued in parent U.S. Appl. No. 17/704,806.

* cited by examiner

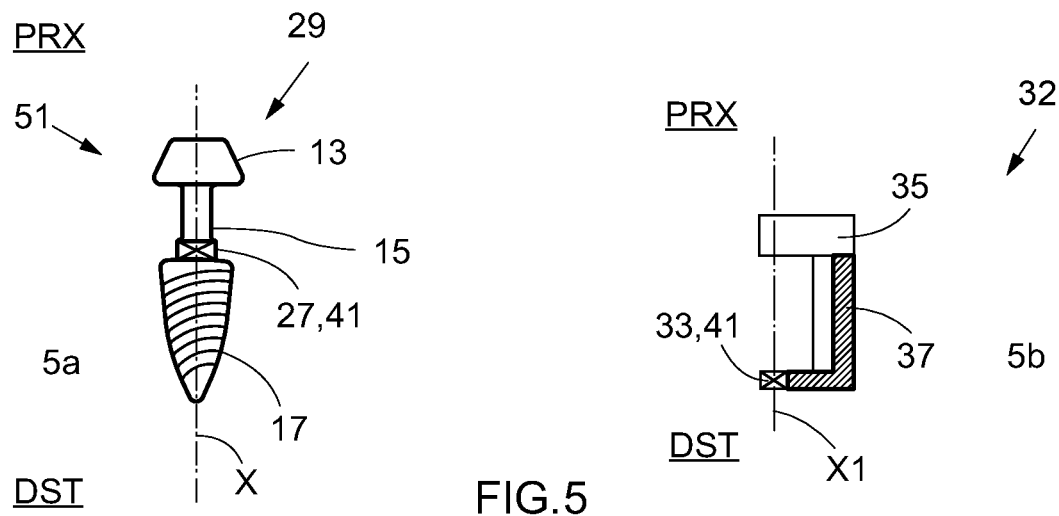
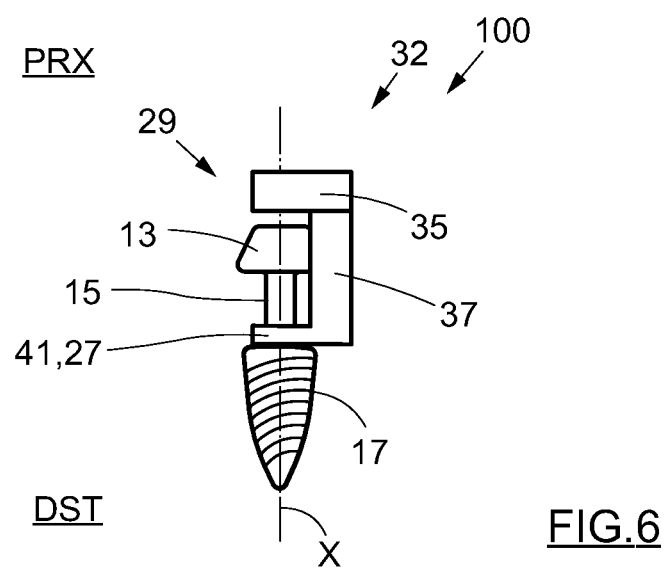

EXTERNAL DRIVE IMPLANTATION APPARATUS FOR BENDABLE COLLAR IMPLANTS AND METHOD

CROSS-REFERENCE TO RELATED APPLICATIONS

This application is a Divisional Application of U.S. application Ser. No. 17/704,806, filed Mar. 25, 2022, which is a continuation of PCT application No. PCT/IL2020/050981, filed Sep. 9, 2020, and claims the benefit of priority of Israeli patent application No. 269728, filed Sep. 26, 2019, the entire contents of all of which are incorporated herein by reference.

TECHNICAL FIELD

The embodiments of the present invention relate to the field of medical implants such as orthopedic implants and dental implants, and in particular to bendable-collar dental implants.

BACKGROUND ART

Medical implants such as orthopedic implants and dental implants are well known per se for many years. Various conventionally available dental implants and tools for implantation may be found in catalogs, such as for example, the Noris Medical Dental Implants Product Catalog 2019.

South Korean Patent No. 200373710Y1 to Moon Young Pil of 21 Jan. 2005, and US Patent Application No. 2006275735 to Bulard et al., recite dental implants having a collar, but need different tools for implantation and for bending.

SUMMARY OF INVENTION

The embodiments of the present invention relate to an external drive implantation apparatus 100 for bendable collar implants. The embodiments comprise a male fastener 29, or one-piece implant 29 constructed as a rigid and integral unit including an implant screw 17, and a collar 15. The embodiments further comprise a male screw-top drive 27 configured for operation in mutual association with a female tool 31 or female driver 31, which supports a female screw-top drive 33. The female driver 31 is configured for application of an implantation torque to the implant screw 17 via the male screw-top drive 27 which is disposed distally away from the collar 15. Thereby, implantation performed with the external drive apparatus 100 prevents the application of torque to the collar 15 and mitigates fracture thereof.

There is also provided a method for constructing an external drive apparatus 100 for bendable collar implants 10 comprising a bendable collar 15 and an implant screw 17. A male fastener 29, and a female driver 31 are operative in mutual association for implantation of the implant screw 17 and for bending the collar 15. The female driver 31 operates for applying an implantation torque to a male screw-top drive 27 which forms an integral proximal portion of the implant screw 17, for averting application of torque to and for mitigating fracture of the bendable collar 15.

There is further provided an external drive apparatus 100 for bendable collar implants comprising a short bendable-collar implant 51 forming a male fastener 29, and a female driver 32. The male fastener 29 supports a bendable collar 15, a male screw-top drive 27, and an implant screw 17 for implantation by application of an implantation torque. Thereby, the female driver 32 is configured to apply the implantation torque onto the male screw-top drive 27 to prevent transfer of torque to the collar 15.

Finally, there is additionally provided a method for constructing an external drive apparatus 100 for bendable collar implants comprising a short bendable-collar implant 51 forming a male fastener 29, and a female driver 31.

Technical Problem

Conventional bendable collar implants 10 may be described concisely as having mainly four sequential portions shown in FIG. 1 and including, from proximal PRX to distal DST direction: a male head drive 23, an abutment 13, a bendable collar 15, and an implant screw 17. The male fastener 29 of the present disclosure may include from proximal PRX to distal DST direction: a male head drive 23, an abutment 13, a bendable collar 15, a male screw-top drive 27, and an implant screw 17, shown aligned along the axis X. This nomenclature for bendable-collar implants 10 is clearly understood by those skilled in the art and therefore, needs not to be described.

Commonly, for implantation, a female tool engages the male head drive 23 for torqueing and implanting the bendable collar implant 10, and next, use of a common tool, not shown, for bending the bendable collar 15 into a desired direction.

For the sake of illustration of the problem, FIG. 1 schematically depicts the main portions of a prior art bendable-collar implant 10, without entering into details which are not relevant to the problem at hand. The collar 15 of the bendable collar implant 10 first endures the torsion and forces of implantation, and next, the strain and stress of the bending moment which is applied thereto for bending after implantation. To endure forces and moments, the collar 15 should be as solid as possible, thus of large cross-section for example. However, for ease of bending, the collar 15 should better be pliant, and thus of relatively small cross-section. These two requirements are rather contradictory. The practical result is that the collar 15 is the weakest link or portion of the bendable-collar implant 10, thus that portion which inherently, is most prone to break, and actually, often breaks.

FIG. 1 shows a commonly available bendable-collar implant 10 having a proximal implant male head drive 23, which remains ex vivo, and which is used to torque the distal implant screw 17 in vivo. In the description, the terms proximal PRX, or proximal top, refer to the ex vivo direction, and distal or distal bottom DST, relate to the in vivo direction. The wording proximal and distal are used for the sake of illustration the drawings and does not correspond to the professional nomenclature used by practitioners.

FIG. 1 illustrates that an implant torque applied to the proximal implant head male drive 23, will be transferred to the implant screw 17, but simultaneously also via the collar 15, which is detrimental thereto. Such a torque may be applied by means of a commonly available female tool, which is not shown, and which may operate in alignment with the axis X of the bendable-collar implant 10 to engage the male head drive 23. Once the bendable-collar implant 10 is implanted, the bendable collar 15 may be bent.

In practice, the bendable collar 15 often breaks just at the intersection of the distal bottom portion of the collar 15 and of the implant screw 17. One reason therefore is known as severe over-torqueing during implantation. Another reason is due to the additional stress caused by the bending moments applied to the already torque-weakened collar 15. A further cause is material fatigue which occurs with time as a result of chewing forces. Whatever the reason, the problem remains the same: how to prevent the application of torsion forces on the collar 15, thus at the same time how to prevent the collar 15 from breaking?

Solution to the Problem

The solution calls for the prevention of application of torqueing moments of force on the bendable collar 15. A solution is provided by use of an external drive apparatus 100 which includes both a male fastener 29, or one-piece implant 29, which is configured for operation in mutual association with a female tool 31 or female driver 31. A male screw-top drive 27 is integrally added distally to the male fastener 29, and the female driver 31 may support a matching female screw-top drive 33. It is by application of an implantation torque directly to and via the male screw-top drive 27 which prevents torque from the thereto proximal collar 15.

The implantation torque is thus applied directly to the male screw-top drive 27 which is an integral portion of the implant screw 17, whereby the implantation torque circumvents the collar 15 which is proximal to the male screw-top drive 27.

Advantageous Effects of Invention

The external drive apparatus 100 prevents the application of torque on the bendable collar 15 by averting torque therefrom. Thereby, the collar 15 does not endure torsion stress and strain. However, should fracture of the bendable collar implant 10 occur at any time during or after implantation, it is the male screw-top drive 27 which allows the broken bendable-collar implant 10 to be easily retrieved by use of a commonly available female tool. Thereby, a surgical intervention for retrieval of the broken collar implant 10 is avoided. Further advantages are described hereinbelow.

BRIEF DESCRIPTION OF DRAWINGS

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements, or parts that appear in more than one figure are preferably labeled with a same or similar number in all the figures in which they appear, in which:

FIGS. 2 to 4 illustrate an embodiment of the external drive, and

FIGS. 5 and 6 depict another embodiment of the external drive.

DESCRIPTION OF EMBODIMENTS

It is noted that the term 'external drive' is found on the Internet in "List of Screws" by Wikipedia, and is defined as: "External drives are characterized by a female tool and a male fastener". In the same manner, the external drive apparatus 100 includes both a female tool 31 and a male fastener 29, to prevent the application of torqueing moments of force on the collar 15.

Figure 1:
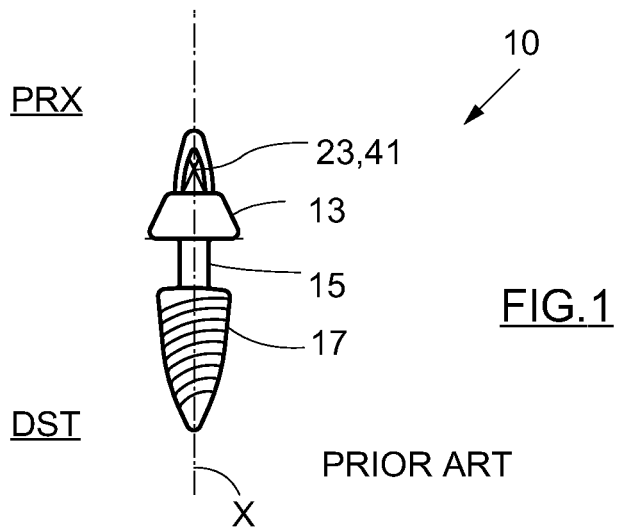
FIG. 1 depicts the background art.
Figure 2:
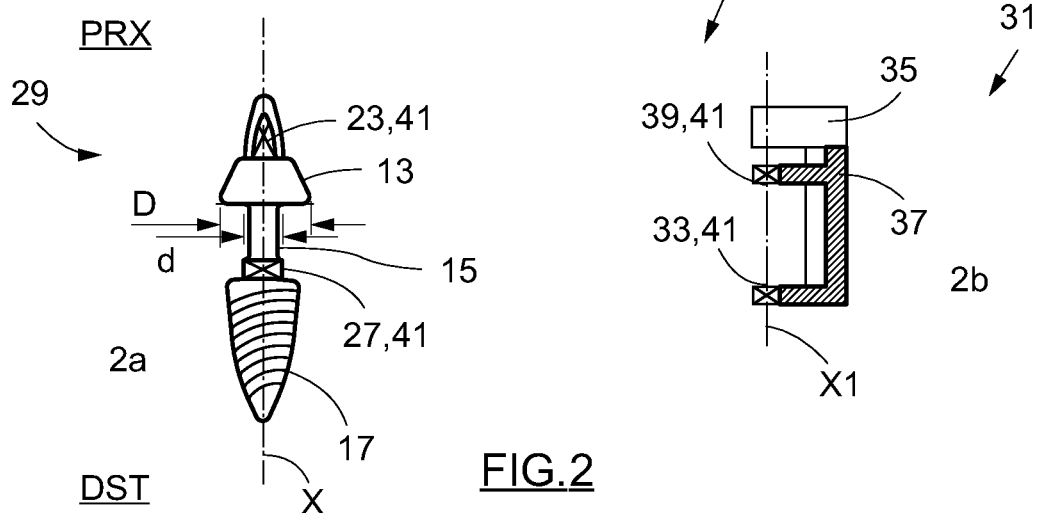

FIG. 2 schematically illustrates an exemplary embodiment of the external drive implantation apparatus 100 for bendable collar dental implants 10. The portion 2a of FIG. 2 shows the male fastener 29, or one-piece implant 29 having a bendable collar 15, and the portion 2b of FIG. 2 shows a female tool 31, or female driver 31. The external drive implantation apparatus 100 shown in FIG. 2 differs from the embodiment described in relation to FIG. 1 by the addition of the male screw-top drive 27 to the male fastener 29, and the addition of the female driver 31. The portions of the male fastener 29 may include a male head drive 23, an abutment 13, a bendable collar 15, the added male screw-top drive, and an implant screw 17, integrally aligned in sequence along the axis X. It is noted that the exterior dimensions d of the male screw-top drive 27 are inferior relative to the thereto superior exterior dimensions D of the abutment 13.

The male fastener 29 is constructed as a bendable-collar implant 15 which is built as a unitary rigid and integral portion of material. Likewise, the female tool 31 is constructed as a female driver 31 which too, is built as a unitary rigid and integral portion of material. The external drive apparatus 100 may be made of the same materials as conventionally available bendable-collar implants, out of metal or of ceramic materials and may be produced by the same conventionally available manufacturing processes including three-dimensional printing, also known as additive manufacturing, which are well known to those skilled in the art.

The female drive tool 31, or female driver 31, shown in relation to portion 2a of FIG. 2, may include, from proximal PRX to distal DST direction, a connection piece 35, a backbone 37, a female head drive 39, and the female screw-top driver 33, which are shown disposed along the alignment line X1.

The connection piece 35 may be rotated by hand, or be coupled to a handle, not shown, say for imparting torque to the male fastener 29, or for the connection thereto of a tool or a grip of some sort, such as for example a socket tool or a ratcheting socket wrench. The backbone 37 is the support of both the female screw-top drive 33 and the female head drive 39, and may be configured as a portion of a trough. Both the female screw-top drive 33 and the female head drive 39 have a female torque transmission and female engagement geometry which matches the male transmission and female engagement geometry of, respectively, the male screw-top drive 27 and the male head drive 23.

As pointed out hereinabove, due to the fact that the external dimensions of the abutment 13 exceed the exterior dimensions of the male screw-top drive 27, it is not possible to torque the male fastener 29 by use of a female tool such as a socket tool for example, which is configured to engage the male fastener 29 by proximal PRX to distal DST direction of motion along the axis of symmetry X. Therefore, the female driver 31 is configured to engage the male head and screw-top drives, respectively 23 and 27, by lateral engagement motion perpendicular to the axis X. It should also be noted that after implantation, the female driver 31 may be used to bend the collar 15. This means that the implant torqueing tool is also the bending tool, which avoids the need to exchange tools.

FIG. 3 shows schematically, two exemplary transmission and engagement geometries of the male and female drives, to emphasize that various and different such geometries may be used. For example, two, as shown in portion 3a of FIG. 3, four, and six, as shown in portion 3b of FIG. 3, or more flats 41 may be implemented, and the same is true for multiple other transmission and engagement geometries, not necessarily using flats 41. Further, the transmission and engagement geometry of the male and female screw-top drive may be different from the male and female geometry of the head drive.

Figure 4:
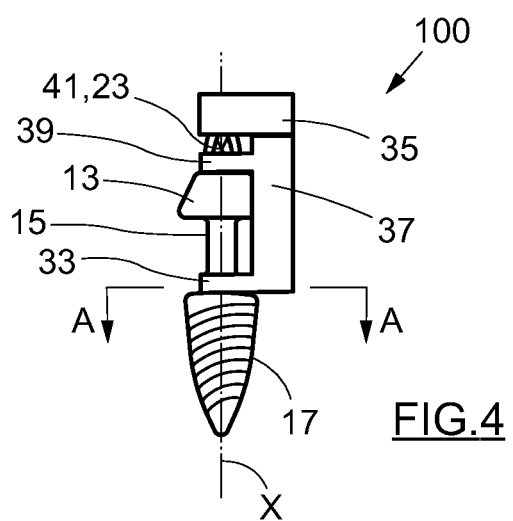

In FIG. 4, the external drive apparatus 100 is depicted in operative disposition, showing the male fastener 29 which is received in the female driver 31 and is partially enveloped thereby. For implantation torqueing of the bendable-collar implant 10, the female screw-top drive 33 has to be engaged with the male screw-top drive 27, and the female head drive 39 has to be engaged with the male head drive 23. It may be said that the male fastener 29 is properly engaged for torque transmission by rotation of the female driver 31 when the axis X of the bendable-collar implant 10 is coaxial with the alignment line X1 of the female driver 31.

In operation, as depicted in FIG. 4, the dedicated female tool 31 and the male fastener 29 are assembled by driving the dedicated female drive tool 31 sideways, thus perpendicular to the axis X, until engagement of the female screw-top drive 33 with the male screw-top drive 27. Thereby, rotation of the female screw-top drive 33 will torque the male screw-top drive 27 and apply the torque moment directly to the implant screw 17. Simultaneously, the female head drive 39 will rotate the male head drive 23, but the torqueing moment will not stress or strain the bendable collar 15.

FIG. 5 schematically illustrates another exemplary embodiment of an external drive apparatus 100, which is configured as a short external drive 51. The portion 5a of FIG. 5 shows the male fastener 29, or one-piece implant 29 having a bendable collar 15, and the portion 5b of FIG. 5 shows a female tool 32, or female driver 32. The external drive apparatus 100 shown in FIG. 5 differs from the embodiment described in relation to FIG. 2 by the deletion of the male head drive 23 from the male fastener 29, and the deletion of the female head drive 39 from the female driver 31. Thereby, both the male fastener 29 and the female driver 31 have a shorter length in comparison with the embodiment described in relation to FIGS. 2 to 4. This is true even though the small male screw-top drive 27 of minor longitudinal and lateral dimensions relative to the deleted male head drive 23 has been added to the male fastener 29. Similarly, the female driver 32 too is shorter after deletion of the connection piece 35 and a proximal portion of the backbone 37. Hence, the short bendable-collar implant 51 is advantageous by having a reduced length, requires less production and inspection processes, and has a reduced weight of material.

The portions of the male fastener 29 of the short external drive 51 may include an abutment 13, a bendable collar 15, a male screw-top drive 27, and an implant screw 17, aligned in longitudinal sequence disposed along an axis of symmetry X.

It is noted that the exterior dimensions d of the male screw-top drive 27 are inferior relative to the thereto superior exterior dimensions D of the abutment 13. The male fastener 29 is constructed as a short bendable-collar implant 51 which is built as a unitary rigid and integral portion of material.

Likewise, the female driver 32 is constructed as a unitary rigid and integral portion of material. The external drive apparatus 100 may be made of the same materials as conventionally available bendable-collar implants, out of metal or of ceramic materials and may be produced by the same conventionally available manufacturing processes including three-dimensional printing, also known as additive manufacturing, which are well known to those skilled in the art.

The female driver 32, described in relation to portion 5a of FIG. 5, may include, from proximal PRX to distal DST direction, a connection piece 35, a backbone 37, and the female screw-top drive 33, shown disposed along the alignment line X1. The connection piece 35 may be rotated by hand, or be coupled to a handle, not shown, say for imparting torque to the male fastener 29, or for connection thereto of a tool or of a grip of some sort, such as for example a socket tool or a ratcheting socket wrench. The backbone 37 is the support of the female screw-top drive 33, and may be configured as a portion of a trough. The female screw-top drive 33 may have a female torque transmission and male engagement geometry which matches the male transmission and engagement geometry of the male screw-top drive 27.

As already pointed out hereinabove, due to the fact that the external dimensions of the abutment 13 exceed the exterior dimensions of the male screw-top drive 27, it is not possible to torque the male fastener 29 by use of a female tool such as a socket tool for example, which is configured to engage the male fastener 29 by proximal PRX to distal DST direction of motion along the axis of symmetry X. Therefore, the female driver 31 is configured to engage the screw-top drive 23 by lateral engagement motion perpendicular to the axis X. It should also be noted that after implantation, the female driver 31 may be used to bend the collar 15. This means that the male fastener 29 may also serve as the bending tool, which avoids the need to retrieve the female driver 31, select a bending tool, and bend the collar 15.

In FIG. 3, two exemplary transmission and engagement geometries of the male and female drives, respectively 29 and 31, are used to emphasize that various and different geometries are practical. For example, two, as shown in portion 3a of FIG. 3, four, and six, as shown in portion 3b of FIG. 3, or more flats 41 may be implemented, and the same is true for multiple other transmission and engagement geometries, not necessarily using flats 41.

In FIG. 6, the external drive apparatus 100 is depicted in operative disposition, showing the male fastener 29 which is received in the female driver 32 and is partially enveloped thereby. For implantation torqueing the bendable-collar implant 10, the female screw-top drive 33 has to be engaged with the male screw-top drive 27. It may be said that the male fastener 29 is properly engaged for torque transmission by rotation of the female 32, when the axis X of the bendable-collar implant 10 is coaxial with the alignment line X1 of the female driver 32.

There has thus been described an external drive apparatus 100 for bendable collar implants, comprising a male fastener 29, or one-piece implant 29 which is constructed as a rigid and integral unit and includes an implant screw 17, a collar 15, and a male screw-top drive 27. Further comprised are a male fastener 29, or one-piece implant 29, which is constructed as a rigid and integral unit including an implant screw 17, a collar 15, and a male screw-top drive 27 which are configured for operation in mutual association with a female tool 31 or female driver 31, which supports a female screw-top drive 33. The female driver 31 is configured for application of an implantation torque to the implant screw 17 via the male screw-top drive 27 which is disposed distally away from the collar 15. Thereby, an implantation performed with the external drive apparatus 100 prevents the application of torque to the collar 15, and at least, mitigates fracture thereof.

The collar 15 is coupled proximally relative to the male screw-top drive 27, which is disposed proximal to the implant screw 17, and the male screw-top drive 27 is configured as a proximal and integral portion of the implant screw 17. The female driver 31 is configured to apply an implant torque on the male screw-top drive 27 to avoid application of torque on the collar 15. When an implanted bendable-collar implant 10 supports a broken collar 15, this last one may be retrieved out of implantation by use of a commonly available female dental tool which matches the male screw-top drive 27.

The exterior dimensions d of the male screw-top drive 27 are smaller than exterior dimensions D of an abutment 13 which is coupled proximally away from the collar 15, and the female driver 31 is configured to support a matching torque-transmitting geometry for application of torque to and for engagement with the male screw-top drive 27. The male screw-top drive 27 has exterior dimensions d which are inferior to the exterior dimensions D of the thereto proximal abutment 13, and the female driver 31 supports a torque-transmitting geometry for torque transmission, which matches the torque transmitting geometry of the male screw-top drive 27. The collar 15 has dimensions which are independent from a measure of the implantation torque. The male screw top drive 27 and the female screw-top drive 33 have a mutually matching torque transmission geometry. The female driver 31 is configured to transfer torque to the male fastener 29 and to circumvent the application of torque to the collar 15.

With one embodiment of the apparatus 100, the male fastener 29 supports a proximal male head drive 23, a collar 15, which is disposed intermediate the male head drive 23 and the male screw-top drive 27. The female driver 31 supports a proximal female head drive 39 and a distal female screw-top drive 33, and the male driver 29 supports a proximal male head drive 23 and a distal male screw-top drive 27. Further, the male head drives, respectively, 23 and 27 are operative in mutual association with the female drives, respectively 39 and 33. Thereby, an implantation torque applied by the female driver 31 to the male fastener 29 simultaneously engages the male drives with the female drives, whereby torque of the collar 15 is averted.

There is also provided a method for constructing an external drive apparatus 100 for bendable collar implants 10 which include a bendable collar 15 and an implant screw 17. The method comprises providing a male fastener 29 and a female driver 31 which are operative in mutual association for implantation of the implant screw 17 and for bending the collar 15. The method further comprises operating the female driver 31 for applying an implantation torque to a male screw-top drive 27 which forms a proximal portion which is integral with a proximal portion of the implant screw 17, for averting application of torque to and for mitigating fracture of the bendable collar 15.

The male screw-top drive 27 forms a proximal portion of the implant screw 17 and is integral with the implant screw 17. The female driver 31 applies an implant torque on the implant screw 17 via the male screw-top drive 27 to avert the application of torque to the collar 15. A commonly available female dental tool which matches the geometry of the male screw-top drive 27 suffices to retrieve an implanted bendable-collar implant 10 having a broken collar 15.

The exterior dimensions d of the male screw-top drive 27 may be smaller than the exterior dimensions D of an abutment 13 which is coupled proximally away from the collar 15, and the female driver 31 may be accordingly configured to support a matching torque-transmitting geometry for application of torque to and for engagement with the male screw-top drive 27.

The external drive apparatus 100 further comprises a short bendable-collar implant 51 forming a male fastener 29, and a female driver 32. The male fastener 29 may support a bendable collar 15, a male screw-top drive 27, and an implant screw 17 for implantation by application of an implantation torque, and the female driver 32 may be configured to apply the implantation torque onto the male screw-top drive 27 to prevent transfer of torque to the collar 15. The male screw-top drive 27 may be integrated as a proximal portion of the implant screw 17. The apparatus 100 further comprises an abutment 13 which is disposed proximally away from the collar 15 which is disposed intermediate the abutment 13 and the male screw-top drive 27. There is further comprised a female screw-top drive 33 configured to engagingly match a torque transmission geometry of the male screw-top drive 27.

The male screw-top drive 27 may be configured to transfer the implantation torque to the implant screw 17, and the implantation torque provided by the female driver 32 circumvents the collar 15. When the collar 15 of the short bendable-collar implant 51 is broken after implantation, retrieval of the broken collar 15 is achieved by commonly available medical tools. Since the male fastener 29 is void of a male head drive 23, the length thereof is reduced relative to the length of an external drive having both a male head drive 23. Likewise, since the female driver 32 is void of a female head drive 33, is of reduced length, the length thereof is reduced relative to the length of an external drive having both a female head drive 39 and a female screw-top drive 33. Thereby, the short bendable-collar implant 51 has a reduced length, a reduced weight, is produced by less production and inspection processes, and has a reduced weight of material. In the same manner, the female driver 32 is of reduced length by being void of a female head drive 39 and of a portion of backbone 37.

It is noted that after implantation of the implant screw 17, the female driver 32 is appropriately configured to bend the collar 15 into a desired direction. Finally, it is noted that a method for constructing an external drive apparatus 100 for bendable collar implants comprising a short bendable-collar implant 51 forming a male fastener 29, and a female driver 32, may be achieved.

INDUSTRIAL APPLICABILITY

The external drive apparatus 100 may find applicability with the dental and/or the medical apparatus industry.

The invention claimed is:

1. A method for constructing an external drive implantation apparatus for bendable collar implants, the method comprising:
   providing a collar implant comprising a male fastener including an implant screw, a proximal male head drive, a distal male screw-top drive, and a bendable collar which is disposed between the proximal male head drive and the distal male screw-top drive; and
   providing a female driver including a proximal female head drive and a distal female screw-top drive,
   wherein:
   the proximal female head drive and the distal female screw-top drive are operable in mutual association with the proximal male head drive and the distal male screw-top drive, and
   the female driver is operable to apply an implantation torque onto the proximal male head drive and the distal male screw-top drive.

2. The method of claim 1, wherein the female driver is further operable to, after implantation of the implant screw, bend the collar in a desired direction.

3. The method of claim 1, wherein the male and female screw-top drives have a first mutual torque transmission and engagement geometry and the male and female head drives have a second mutual torque transmission and engagement geometry.

4. The method of claim 3, wherein the first mutual torque transmission and engagement geometry is the same as the second mutual torque transmission and engagement geometry.

5. The method of claim 3, wherein the first mutual torque transmission and engagement geometry is different from the second mutual torque transmission and engagement geometry.

\* \* \* \* \*